Patented July 20, 1926.

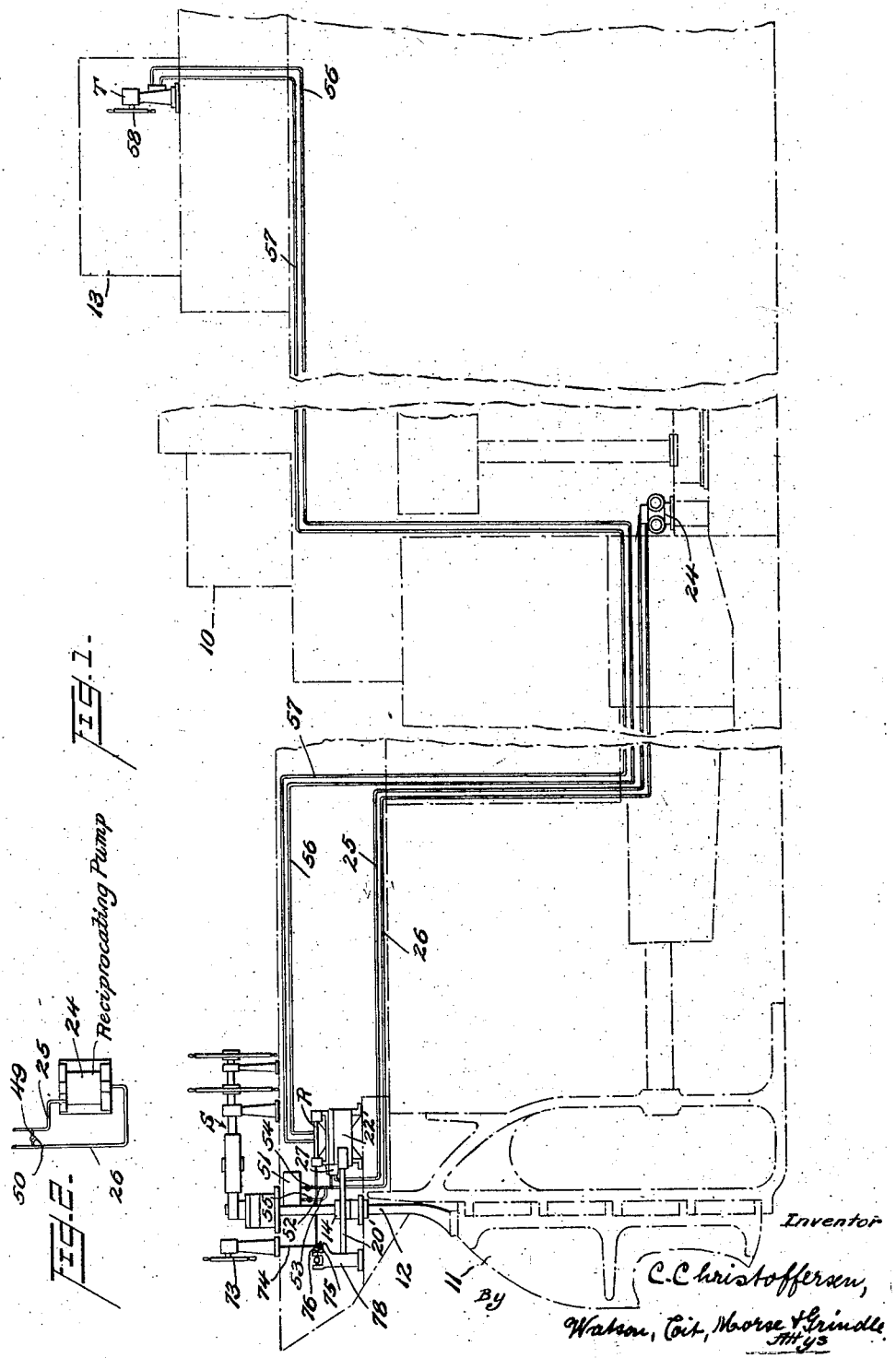

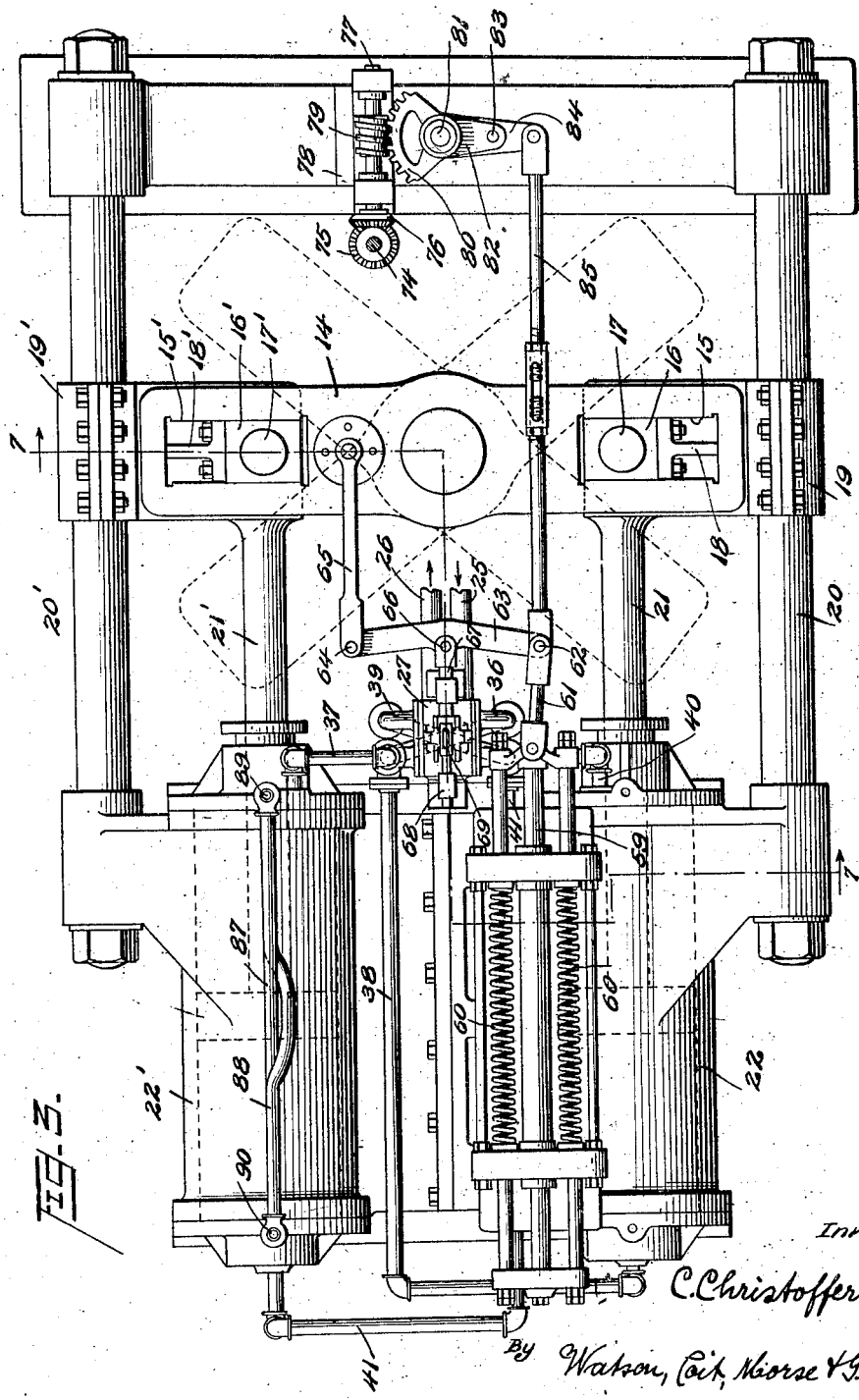

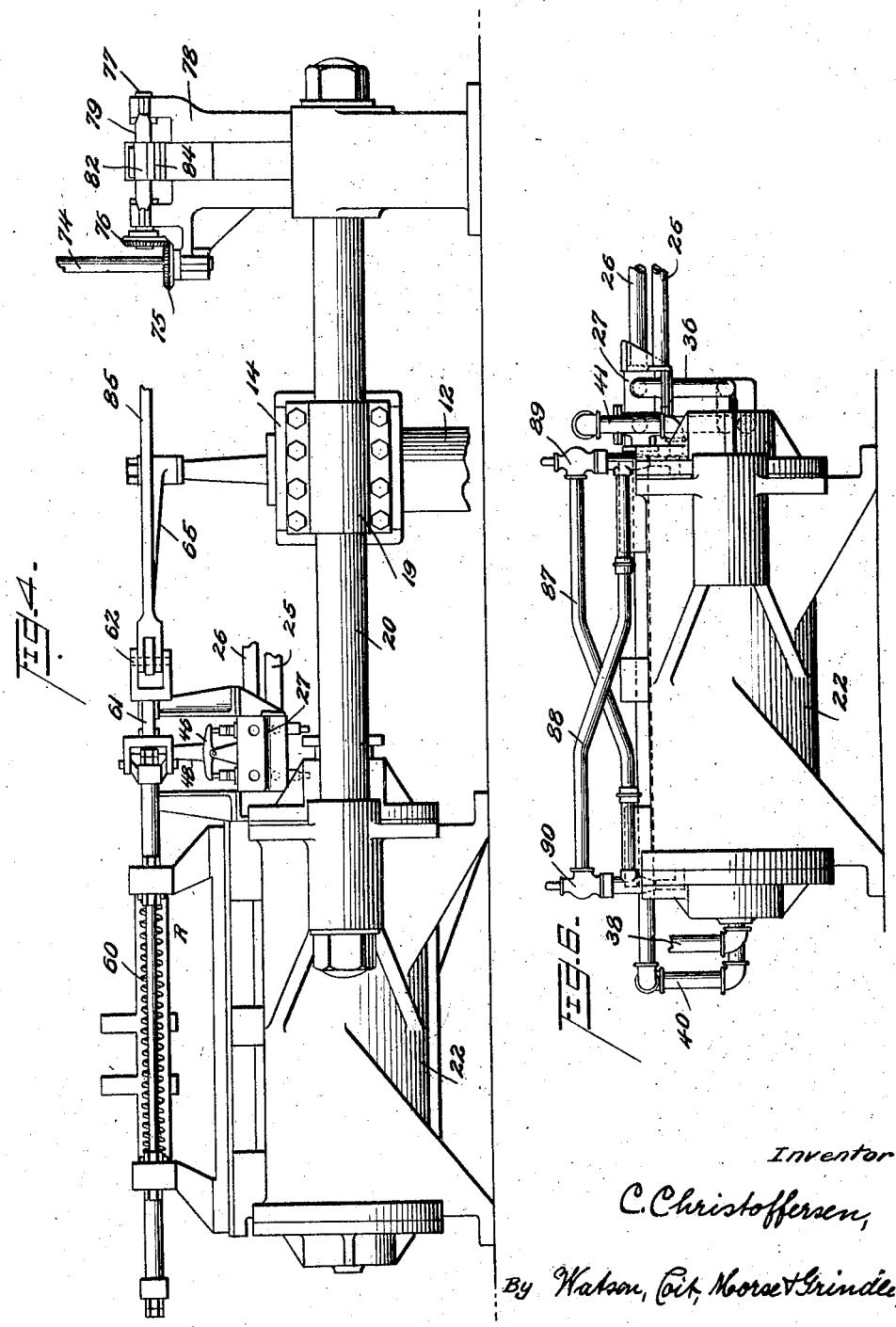

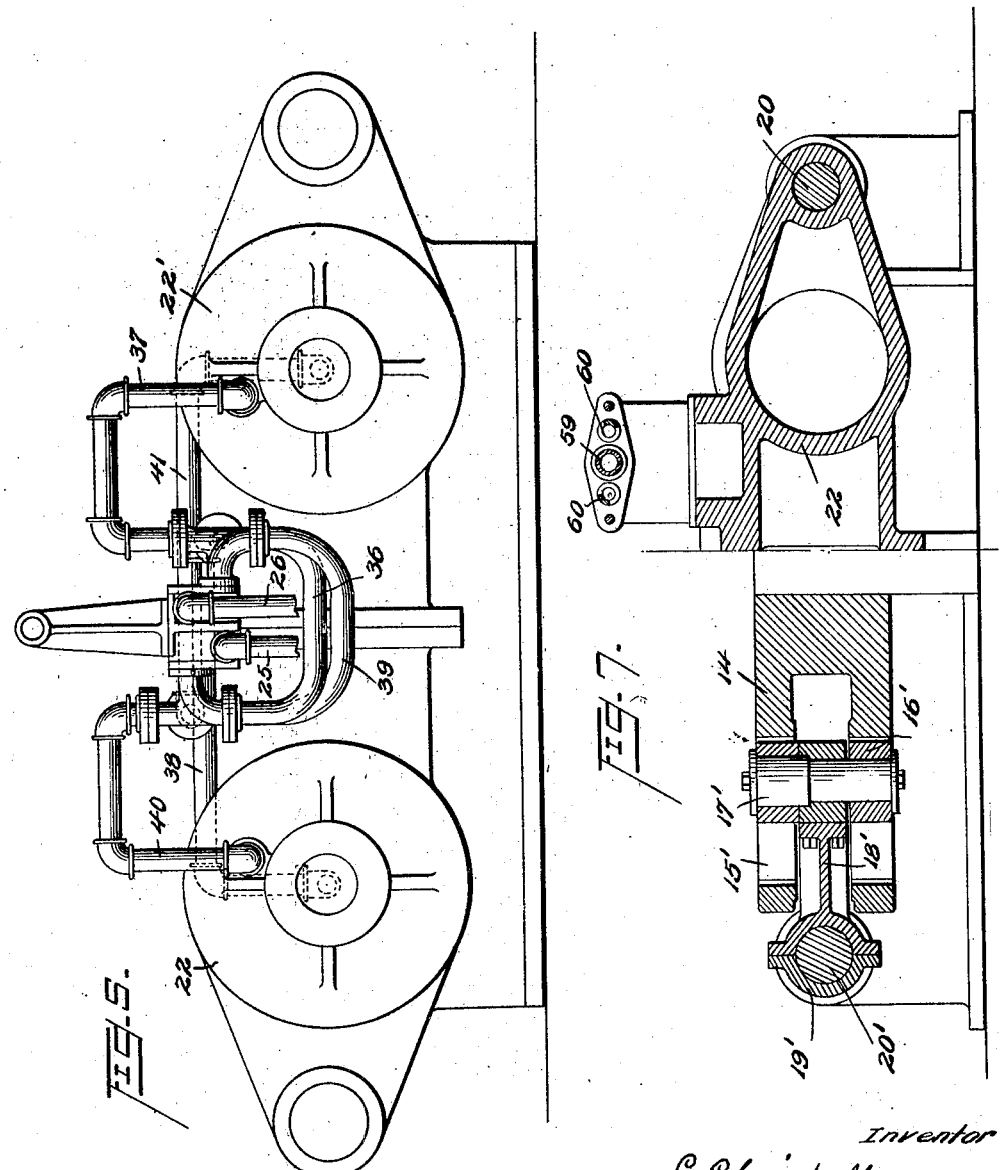

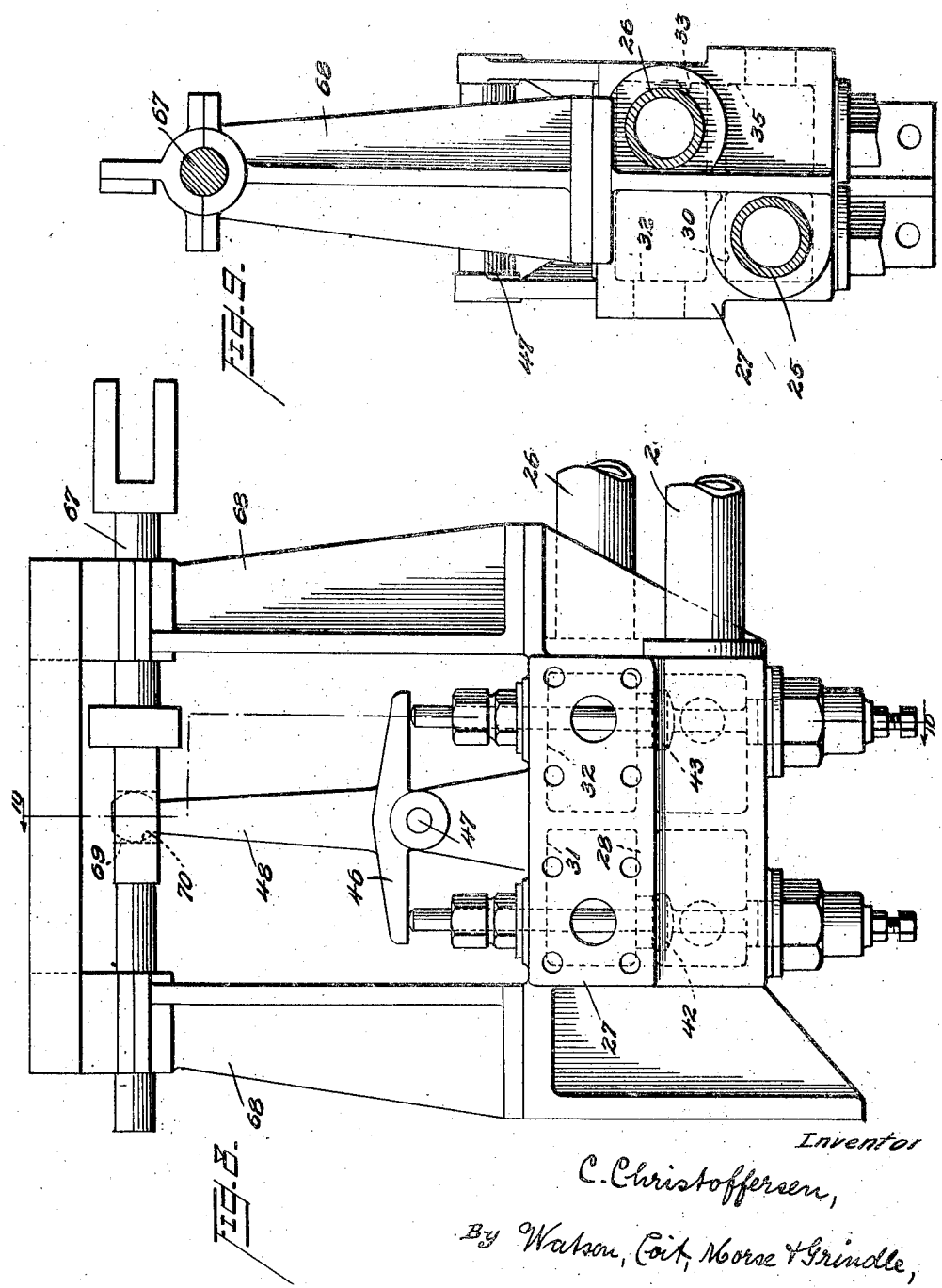

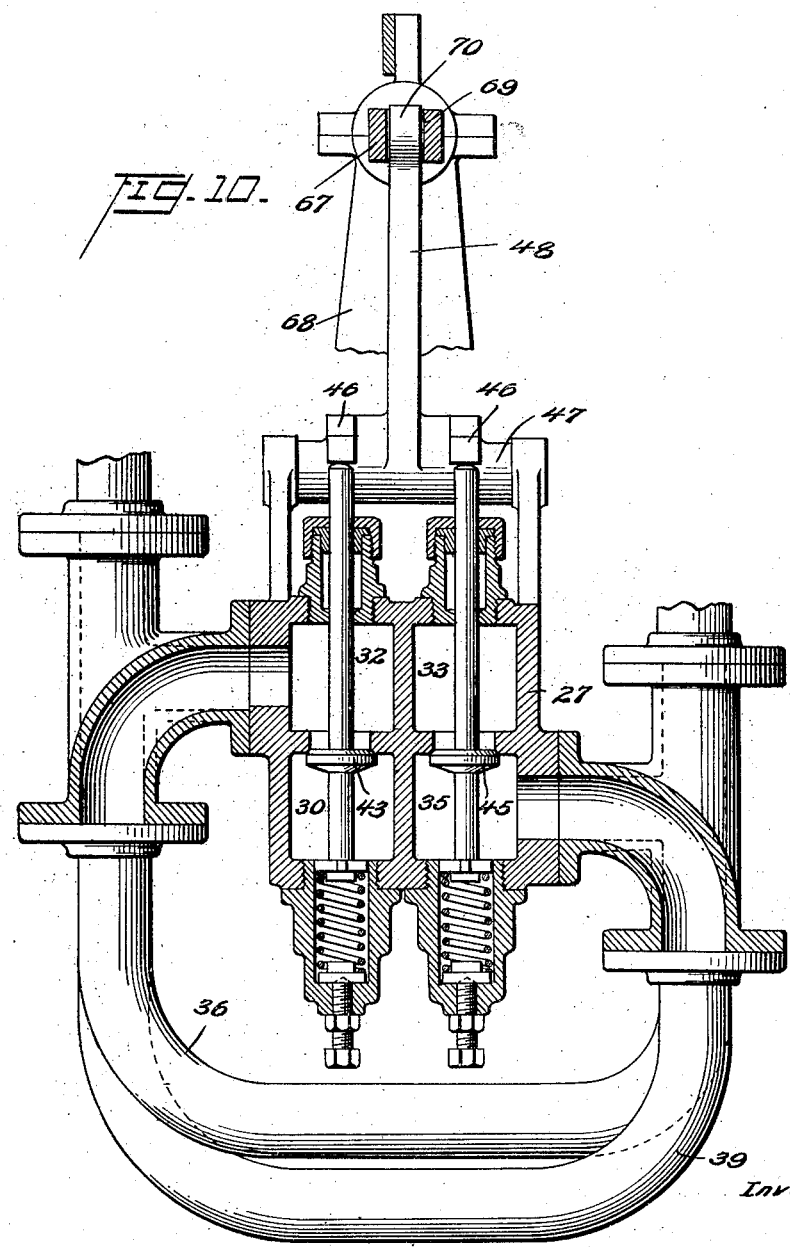

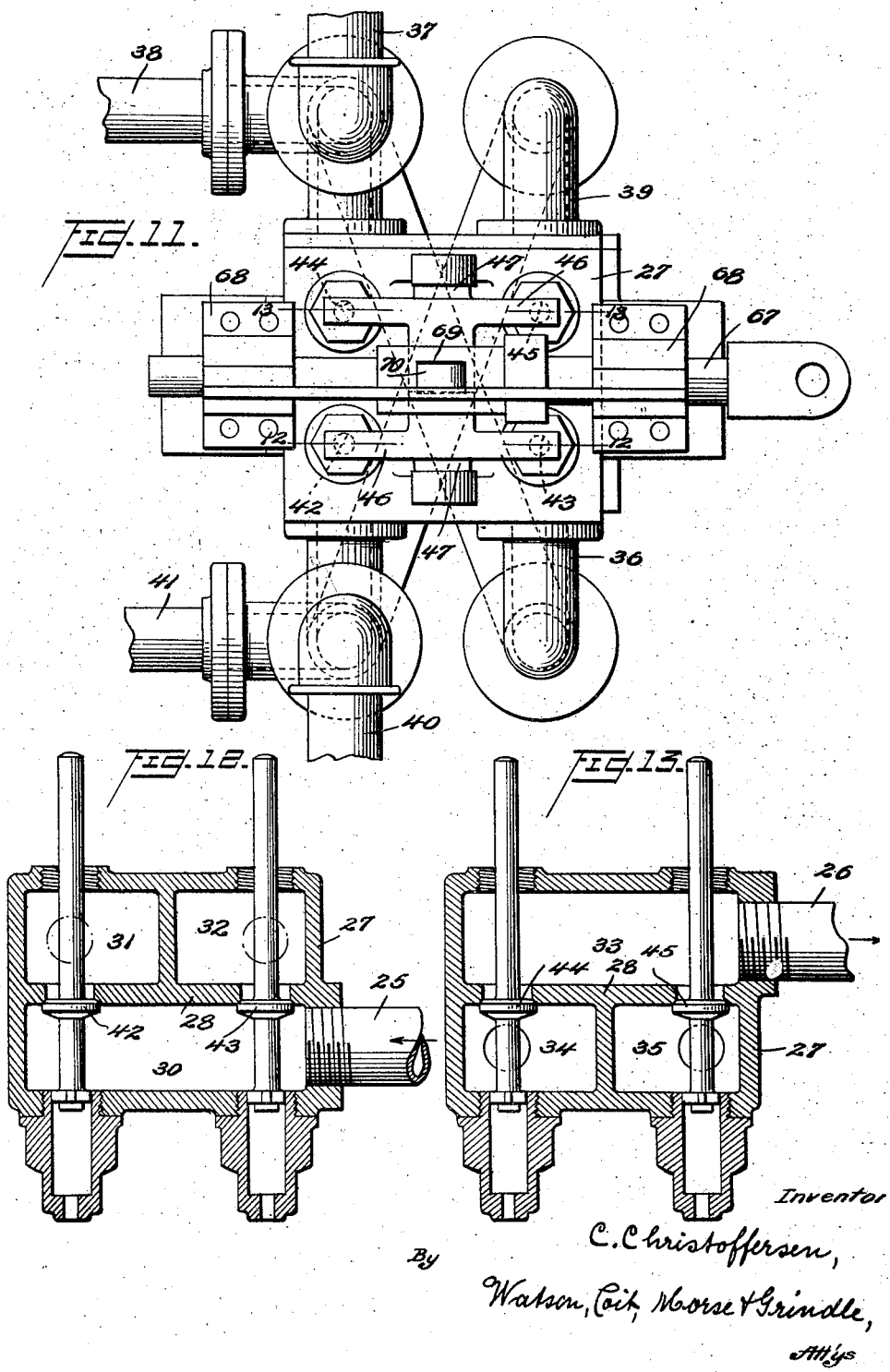

1,593,328

UNITED STATES PATENT OFFICE.

CHRISTOFFER CHRISTOFFERSEN, OF ELIZABETH, NEW JERSEY, ASSIGNOR TO BETHLEHEM SHIPBUILDING CORPORATION, LTD., A CORPORATION OF DELAWARE.

STEERING APPARATUS.

Application filed March 10, 1921. Serial No. 451,271.

The present invention relates to steering apparatus for vessels, particularly to that type of steering apparatus in which the rudder is actuated by hydraulic pressure developed by a pump and acting upon one or more pistons of a steering engine connected to the rudder post, the flow of the fluid under pressure from the pump to the steering engine being controlled from a distant point, as the pilot house.

An object of the invention is to provide an improved steering engine having novel valve means for controlling the flow of fluid under pressure to the cylinders, having novel means for connecting the pistons and the rudder yoke and numerous additional new features rendering it simple in construction and efficient in operation. Another object of the invention is to provide a convenient hand controlling means for the steering engine which, though normally disconnected from the steering engine, may be readily connected thereto whenever the means for controlling the engine from a distant point has become disabled or temporarily out of order. A further object of the invention is to provide an apparatus of the class indicated in which the motive fluid is put under pressure by a reciprocating pump driven by steam from the main boiler of the vessel thereby avoiding the use of a rotary pump such as is usually provided and its special driving turbine or other means.

Other objects of the invention and advantages will become apparent as it is disclosed in the following description and in the accompanying drawings in which:

Figure 1 illustrates in broken lines portions of a vessel as viewed from the side, showing the steering apparatus in full lines;

Figure 2 is a plan view of the steam pump and the conduits leading therefrom showing the by-pass and valve;

Figure 3 is a plan view of the steering engine;

Figure 4 is a side view of the same, the fluid conducting pipes being omitted for the sake of clearness;

Figure 5 is an end view;

Figure 6 is a side view of the steering engine, parts being omitted so that the arrangement of fluid conduits can be clearly discerned;

Figure 7 is a section on the line 7—7 of Figure 3;

Figure 8 is a side view of the controlling valve casing to a larger scale;

Figure 9 is an end view of the same;

Figure 10 is a section on line 10—10 of Figure 8 and also showing certain of the fluid conduits connected to the valve casing;

Figure 11 is a plan view of the valve casing; and

Figures 12 and 13 are sections on lines 12—12 and 13—13 respectively of Figure 11.

The hull of the vessel in which the hydraulic steering mechanism is installed is indicated at 10 in the drawings, this vessel having a rudder 11 provided with rudder post 12 at the stern, and a pilot house 13 toward the bow. The rudder post extends upwardly through the deck and a manually operable steering mechanism indicated at S is adapted to be operatively connected to the top of this rudder post so that when the hydraulic steering engine and its controlling apparatus hereinafter to be described, become for any reason out of order, the ship may be steered manually by such mechanism. The steering post 12 extends through the chamber in which the steering engine is located and secured to this post within the chamber is a steering yoke 14. This yoke is provided with longitudinal vertical slots 15 and 15' equidistantly spaced from the pivotal axis of the rudder post and slidably fitting in these slots are blocks 16 and 16' which are rotatably supported on the upper and lower ends of pins 17 and 17' which are in turn supported by the ends of piston rods 21 and 21'. The lateral arms 18 and 18' of cross-heads 19 and 19', slidably mounted on guide rods 20 and 20', are bolted to the outer ends of the piston rods. The yoke 14 is, of course, horizontally slotted to receive arms 18 and 18'. The piston rods extend into cylinders 22 and 22' respectively, and have pistons 23 and 23' secured to their ends, these pistons being freely reciprocable within the cylinders. The pistons are adapted to be driven in opposite directions simultaneously by motive fluid from a pump and to therefore rotate the yoke 14 and hence the rudder in either direction, the blocks 16 and 16' sliding in slots 15 and 15' as the yoke is moved, and the piston rods and blocks being constrained to move in straight lines and axially of the cylinders by cross-heads 19 and 19' which slide on guides 20 and 20' which, as previously explained, are arranged parallel to the axes of the cylinders respectively.

Located preferably adjacent the engines of the vessel is a reciprocating fluid pump 24 operated by steam from the boiler, and conduits 25 and 26 respectively connect the outlet and inlet ports of this pump to a box-like valve casing 27 located adjacent the rear ends of cylinders 22 and 22'. This valve casing 27 is divided by a horizontal middle partition 28 and by vertical partitions into six chambers or compartments, three of these compartments being above the middle partition 28 and three below. These compartments are indicated by the numerals 30, 31, 32, 33, 34 and 35. The conduits 25 and 26 leading from and to the fluid pump open into compartments 30 and 33 respectively. The compartment 32 is connected by means of pipes 36, 37 and 38 with the right hand end of cylinder 22' and the left hand end of cylinder 22 (Figure 3) and compartment 35 is connected to the opposite ends respectively, of the two cylinders, by pipes 39, 40 and 41.

Connecting compartment 30 with compartments 31 and 32 and also connecting compartment 33 with compartments 34 and 35 are ports normally closed by valves 42, 43, 44 and 45 respectively, each of these valves being normally held in closed position by a spring located beneath the lower end of the valve stem, as clearly illustrated in Figure 10, the valves extending upwardly through suitable packing boxes to the exterior of the valve casing and having their upper ends in the same plane to be acted on by levers 46 of a rocker rotatably mounted on a shaft 47 supported on the top of the valve casing. This rocker has an upwardly extending operating arm 48, the arrangement of the rocker relative to the valve casing being such that when it is in central position, as shown in Figure 8, the four valve operating levers 46 are in contact with the upper ends of the valve stems which they are intended to operate. Upon the movement of the operating arm in either direction, it will be seen that two of the valves will be opened, for instance, if arm 48 is moved to the right (Figure 8) levers 46 will act on the valve stems of valves 43 and 45, thereby causing these valves to open against the pressure of the springs and to bring compartments 30 and 32 into communication with each other and also compartments 33 and 35 into communication.

Assuming the operating arm 48 to be moved in the manner described and valves 43 and 45 to be opened, it will be seen that the fluid pressure which is already existent in compartment 30 will be communicated immediately to compartment 32 and thence through pipes 36, 37 and 38 to the right hand end of cylinder 22' and the left hand end of cylinder 22 and that the left hand end of cylinder 22' and the right hand end of cylinder 22, which communicate respectively by pipes 40 and 41 with compartment 35 of the valve casing will be brought into communication with the intake of pump 24 through chamber 33 and pipe 26. As a result of pressure being applied on the right hand side of the piston in cylinder 22' and the left hand side of the piston of cylinder 22 and the pressures in the opposite ends of these cylinders respectively being relieved, the yoke 14 and hence the rudder will be rotated through an angle which is determined by the extent of movement of the operating arm 48. If, instead of moving operating arm 48 to the right it is moved to the left, valves 42 and 44 will open and valves 43 and 45 will remain in closed position, the flow of fluid to the cylinders being in the opposite direction and causing rotation of the rudder in the opposite direction. The pump 24 is operating continuously and in order to cut down the back pressure and save its bearings when the valves in valve casing 27 are closed, a by-pass 49 is provided, this by-pass having a needle valve 50 by means of which the rate of flow of fluid therethrough may be controlled. The fluid impelled by the reciprocating pistons of the pump has a constantly varying pressure but it has been found that the provision of the by-pass prevents completely the generation of excessive and destructive pressures in the system. The fluid used is preferably a non-compressible liquid such as water or oil, and to supply to the system liquid to replace any which may have escaped therefrom by leakage, a tank 51 is provided, this tank being located, as shown in Figure 1, above the level of the steering engine and being connected by two separate pipes 52 and 53 to the pipe 26. A check valve 54 in pipe 52 prevents back flow of fluid into the tank due to the pressure created by the pump when operating, and relief valve 55 in pipe 53 allows the liquid to escape into the tank 51 when for any reason the pressure of the fluid in the system has become excessive which may occur because of expansion through heat or as a result of other causes.

Associated with the steering engine above described is a telemotor for effecting the movement of the operating arm 48 of the rocker which opens the valves. The details of this telemotor form no part of the present invention and it may be of any well known type, for instance, that illustrated, described and claimed in the patent to John F. Johnston, issued April 29, 1919, No. 1,302,376. The transmitter of the telemotor is located in the pilot house 13 and is indicated at T in the drawings, the receiver thereof is positioned immediately above the steering engine and is supported thereon, this receiver being indicated by R. Connecting the transmitter and the receiver are fluid conduits 56 and 57 preferably of drawn copper tubing, seamless and with a minimum number of brazed or soldered joints so that leakage is practically prevented. The rotation of the hand wheel 58 in the pilot house causes a pressure to be exerted upon a noncompressible liquid in one of the tubes 56 or 57 and as a result of this pressure, the member 59 of the receiver is moved in one direction or the other against the pressure of springs 60. The member 59 is pivotally connected to a link 61 which is pivoted at 62 to one end of a lever 63 which has its other end pivotally connected at 64 to link 65 pivotally connected to the yoke 14. The middle point of the lever 63 is pivotally connected at 66 to a reciprocable rod 67 slidably mounted in pedestals 68 supported on the top of the valve casing. This rod 67 has a central opening 69 which receives the ball shaped end 70 of operating arm 48 so that whenever the rod 67 is longitudinally moved in its bearings, the operating arm is also moved and two of the valves either opened or closed, the pair of valves thus moved depending upon the direction of movement of the rod 67.

Assuming the member 59 of the receiver of the telemotor to be moved toward the right (Figure 3) by the operation of the transmitter it will be seen that the rod 67 will be also moved to the right, the lever 63 pivoting about point 64. As a result the rudder is turned to the right by the steering engine in the manner heretofore fully described. If member 59 of the receiver is moved toward the left, the reverse action takes place and the rudder will be moved toward the left. Assuming, however, that member 59 and hence operating arm 48 have been moved toward the right, that is, in a counter-clockwise direction, it will be seen that as the rudder and the yoke turn the link 65 and the pivot 64 will move toward the left (Figure 3), the lever 63 pivoting about pivot 62 and that this action will continue until rod 67 has been returned to neutral position, returning at the same time the rocker 48 to its central position and closing the valves. With the valves closed all movement of the steering engine ceases and the rudder is held in the position to which it has been turned. By the use of lever 63 and link 65 therefore the action of the steering engine is automatically stopped at the proper time, with the rudder in a position which has been determined by the extent of rotation of the steering wheel 58.

In case the telemotor becomes inoperative for any reason, the steering engine may still be controlled from hand wheel 73 located at the stern of the vessel, rotation of this hand wheel being transmitted by a rotatable rod 74 to a bevel gear 75 meshing with a second bevel gear 76 fixed on rotatable shaft 77 supported on the pedestal 78 and having worm 79 fixed thereon. This worm 79 meshes with a segment 80 pivoted at 81 and having an arm 82 provided with an aperture 83. The arm 82 overlies a lever 84 also pivoted on member 81, this arm being provided with a circular aperture adapted to register with aperture 83 of arm 82, and being connected by means of link 85 to the end of lever 62. Lever 84 is rotatable entirely independently of segment 80 and arm 82, but a pin may be inserted through aperture 83 and the aperture in lever 84 which is aligned therewith, to lock these members together for simultaneous movement. It is, therefore, apparent that by means of a pin the hand wheel 73 may be connected to or disconnected from the lever 62 as desired, and that while the steering may be accomplished entirely by means of the hand wheel in the pilot house, yet in case of need the steering may be entirely done by hand wheel 73 by merely inserting a pin, as before described, locking the members 82 and 84 together.

To prevent the straining or damaging of the cylinders 22 and 22′ whenever a wave or floating obstacle strikes the rudder and tends to rotate the yoke 14, the ends of each cylinder are connected by two pipes 87 and 88, relief valves 89 and 90, clearly shown in Figure 6, being provided so that whenever the pressure in one end of the cylinder exceeds a predetermined amount, liquid may pass from this end to the opposite end, relieving the pressure and allowing the piston to move somewhat.

The design and arrangement of the several parts of the invention may be considerably changed within the scope of this invention which is not limited to the exact embodiment described and illustrated.

Having thus described the invention what I claim as new and desire to secure by Letters Patent is:

1. In steering apparatus for vessels, in combination, a rudder steering engine, a continuously operating reciprocating pump of the constant displacement type, pressure and suction lines connected to the pump, controlling valve mechanism between the lines and the engine, whereby fluid may be supplied to the latter from the pressure line and exhausted therefrom to the suction line, a by-pass connecting the lines, and an adjustable valve in the by-pass.

2. In steering apparatus for vessels, in combination, a rudder steering engine of the hydraulic type, a continuously operating reciprocating hydraulic pump of the constant displacement type, pressure and suction lines connected to the pump, controlling valve mechanism between the lines and the engine, whereby fluid may be supplied to the latter from the pressure line and exhausted therefrom to the suction line, a by-pass connecting the lines, and an adjustable needle valve in the by-pass.

3. In a steering apparatus for vessels, in combination, a rudder, a reciprocating pump, pressure and return lines connected to the pump, first and second operating cylinders, operating pistons in the cylinders connected to the rudder, a valve housing, a pressure chamber in the housing connected to the pressure line, an exhaust chamber in the housing connected to the return line, first and second chambers in the housing connected by ports to the pressure chamber, first and second valves for controlling the ports, the first chamber communicating with the fore end of the first cylinder and the aft end of the second cylinder and the second chamber communicating with the aft end of the first cylinder and the fore end of the second cylinder, third and fourth chambers in said housing connected by ports to the exhaust chamber, third and fourth valves for controlling the last-named ports, the third chamber communicating with the aft end of the first cylinder and the fore end of the second cylinder and the fourth chamber communicating with the fore end of the first cylinder and the aft end of the second cylinder, a member for opening the first and third valves when moved in one direction and for opening the second and fourth valves when moved in the other direction, a lever connected to said member, a second lever connected at an intermediate point to said first lever, one end of the second lever being connected to the rudder, and operating means connected to the other end of the second lever for securing operation of said valves.

In testimony whereof I affix my signature.

CHRISTOFFER CHRISTOFFERSEN.